United States Patent [19]

Grigsby, Jr. et al.

[11] Patent Number: 4,609,683
[45] Date of Patent: Sep. 2, 1986

[54] QUASI-PREPOLYMERS FROM ISATOIC ANHYDRIDE DERIVATIVES OF POLYOXYALKYLENE POLYAMINES AND RIM PRODUCTS MADE THEREFROM

[75] Inventors: Robert A. Grigsby, Jr., Georgetown; Richard J. G. Dominguez, Austin, both of Tex.

[73] Assignee: Texaco Inc., White Plains, N.Y.

[21] Appl. No.: 747,521

[22] Filed: Jun. 21, 1985

[51] Int. Cl.⁴ .............................................. C08G 18/14
[52] U.S. Cl. ..................................... 521/159; 528/59; 528/64; 528/76; 528/77; 528/78; 528/79
[58] Field of Search ................... 521/159; 528/59, 64, 528/76, 77, 78, 79

[56] References Cited

U.S. PATENT DOCUMENTS

| | | |
|---|---|---|
| 3,256,213 | 6/1966 | Gmitter et al. |
| 3,808,250 | 4/1974 | Blahak et al. |
| 3,975,428 | 8/1976 | Blahak et al. |
| 4,016,143 | 4/1977 | Blahak et al. |
| 4,136,091 | 1/1979 | Mazanek et al. |
| 4,169,206 | 9/1979 | Mazanek et al. |
| 4,180,644 | 12/1979 | Marquis et al. |
| 4,191,706 | 3/1980 | Marquis et al. |
| 4,194,070 | 3/1980 | Marquis et al. |
| 4,239,700 | 12/1980 | Marquis et al. |
| 4,260,557 | 4/1981 | Mazanek et al. |
| 4,328,322 | 5/1982 | Baron |
| 4,504,278 | 3/1985 | Sung |
| 4,515,981 | 5/1985 | Otani et al. |
| 4,530,941 | 7/1985 | Turner et al. |

FOREIGN PATENT DOCUMENTS 0081701 11/1982 European Pat. Off.

OTHER PUBLICATIONS

Clark and Wagner, "Isatoic Anhydride. I. Reactions With Primary and Secondary Amines and With Some Amides," J. Org. Chem. 9, 55–67, (1944).

Staiger and Wagner, "Isatoic Anhydride. II. Reactions of Isatoic Anhydride With Ammonia," J. Org. Chem. 13, 347–352, (1948).

Staiger and Wagner, "Isatoic Anhydride. III. Reactions With Primary and Secondary Amines", J. Org. Chem. 18, 1427–1429, (1953).

Staiger and Miller, "Isatoic Anhydride. IV. Reactions With Various Nucleophiles," J. Org. Chem. 24, 1214–1219, (1959).

"Isatoic Anhydride Derivatives," Technical Bulletin 152, Sherwin Williams Chemicals (1975).

Primary Examiner—Maurice J. Welsh
Attorney, Agent, or Firm—Jack H. Park; Kenneth R. Priem

[57] ABSTRACT

Quasi-prepolymers are made from aromatic isocyanates and aromatic-amine amides which comprise the reaction product of a polyoxyalkylene polyamine selected from the group consisting of diamines, triamines and mixtures thereof, and an isatoic anhydride of the formula:

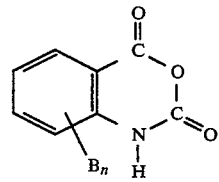

where B is selected from the group consisting of hydrogen, alkyl, nitro, halo, hydroxy, amino and cyano and n is a number from 1 to 4. Such materials are useful for the production of reaction injection molded elastomers having improved properties.

7 Claims, No Drawings

QUASI-PREPOLYMERS FROM ISATOIC ANHYDRIDE DERIVATIVES OF POLYOXYALKYLENE POLYAMINES AND RIM PRODUCTS MADE THEREFROM

CROSS-REFERENCES TO RELATED APPLICATIONS

This application is related to Ser. No. 747,527, and Ser. No. 747,528, all filed of even date.

BACKGROUND OF THE INVENTION

1. Field of the Invention

Reaction injection molded (RIM) materials based on the reaction of a high molecular weight polyoxyalkylene polyamine and an aromatic isocyanate provide valuable materials for use in the automotive industry.

2. Description of Other Publications in the Field

U.S. Pat. Nos. 4,433,067; 4,396,729 and 4,444,910 are examples of reaction injection molded (RIM) products.

U.S. Pat. Nos. 4,191,706; 4,180,644; 4,194,070 and 4,239,700 disclose the manufacture and use of reaction products of polyoxyalkylene amines with an isatoic anhydride to form crosslinkers for use as polyurethane chain extenders.

The invention embodied herein discloses the manufacture and use of a higher molecular weight polyoxyalkylene polyamine than disclosed and/or claimed in these four patents reacted with an isatoic anhydride which is then formed into a quasi-prepolymer by reaction with an aromatic polyisocyanate.

Further objects of our invention will be apparent to those skilled in the art in view of the aforementioned background and the following discussion and accompanying examples.

SUMMARY OF THE INVENTION

The invention is quasi-prepolymers made from the reaction between aromatic isocyanates and aromatic amine-amide compositions which comprise a reaction product of a polyoxyalkylene polyamine selected from the group consisting of triamines wherein the alkylene is ethylene, propylene or butylene, having an average molecular weight of above about 400 to 10,000 and diamines of the formula:

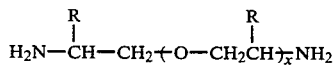

wherein x is an integer of at least about 2.6 to 84 and R is hydrogen, methyl or ethyl, and an isatoic anhydride of the formula:

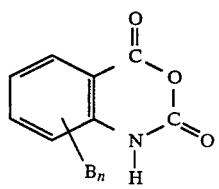

where B is selected from the group consisting of hydrogen, alkyl, nitro, halo, hydroxy, amino and cyano and n is a number from 1 to 4. The invention is also RIM products made from these quasi-prepolymers.

DESCRIPTION OF THE PREFERRED EMBODIMENTS

Compounds prepared from triamines have the following structural formula:

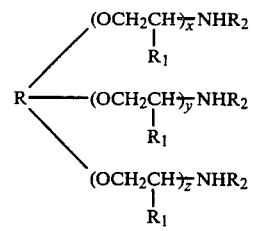

where R is an alkyl or aryl group and where $R_1$ is hydrogen, methyl or ethyl, where the sum of x, y and z is from about 5 to about 175, and where $R_2$ is hydrogen or the group:

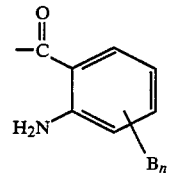

where B is selected from the group consisting of hydrogen, alkyl, nitro, halo, hydroxy, amino and cyano and n is a number from 1 to 4 wherein said group must be present in at least one occurrence.

In order to prepare the above compounds an isatoic anhydride of the formula:

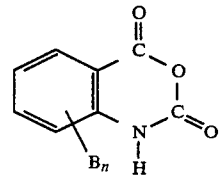

where B is selected from the group consisting of hydrogen, alkyl, nitro, halo, hydroxy, amino and cyano and n is a number of from 1 to 4, is reacted with a polyoxyalkylene polyamine. The isatoic anhydrides are well known materials and their preparation need not be discussed in detail. A preferred reactant is isatoic anhydride itself, where $B_n$ is H.

Polyoxyalkylene polyamines, and procedures for their preparation, useful in producing the compounds of the invention are well known and amply described in the literature. See, for example, U.S. Pat. No. 3,654,370.

In accordance with the invention, we employ polyoxyalkylenediamines of the formula:

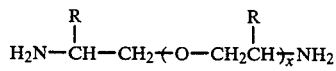

wherein x is an integer of from about 2.6 to 84, preferably from about 41 to 84, and R is hydrogen, methyl or ethyl, preferably methyl, and preferably and polyoxyalkylene triamines of the formula:

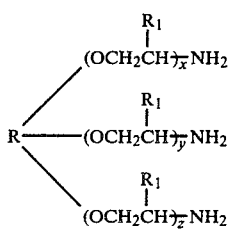

where R is an alkyl or aryl and where the sum of x, y and z is from about 5 to about 175, preferably from about 53 to 175, and R is hydrogen, methyl or ethyl, preferably methyl. Preferred polyoxyalkylene triamines of the above formula have average molecular weights between above about 3200 to about 7000. Polyoxyalkylene di- and triamines are readily available commercially such as those sold by Texaco Chemical Co., Inc., Bellaire, Tex., under the trademark JEFFAMINE ®.

In order to make the isatoic anhydride modified polyoxyalkylene polyamine, the above reactants are simply mixed together without necessity of solvent or diluent and heated. When the reaction is finished, the product requires no further treatment or purification. In addition, no catalyst is necessary to effect the reaction although optical use of a catalyst is within the scope of the invention. The products are generally liquid rather than crystalline solids. The temperature of reaction may range from about 0° C. to about 200° C. at a pressure ranging from atmospheric pressure to about 1000 psig.

For example, when one mole of the isatoic anhydride is added per mole of diamine only one of the terminal amine groups is reacted to produce a monoamide also containing one aromatic and one aliphatic amine group. On the other hand, if two moles of the anhydride are reacted with one mole of the diamine both terminal groups are reacted to produce a diamide structure containing two aromatic amine groups. A corresponding situation, of course, exists with respect to reaction of the isatoic anhydride, for example, with a triamine. That is, 1, 2 or 3 of the terminal amines may be reacted to produce a mono-, di- or triamide amine structure.

The above described materials are used to prepare quasi-prepolymers by reacting them with an excess of aromatic isocyanate in a conventional manner.

These quasi-prepolymers are particularly useful in preparing improved RIM compositions. A single high molecular weight isatoic anhydride derivative of an amine terminated polyether (polyoxyalkylene polyamine) resin may be used to prepare the RIM product. Also, mixtures of high molecular weight amine terminated polyols such as mixtures of di- and trifunctional materials and/or different molecular weight or different chemical composition materials may be used.

Useful chain extenders include low molecular weight linear diols such as 1,4-butane diol, propylene glycol and ethylene glycol. Ethylene glycol is especially preferred. Other chain extenders, including cyclic diols such as 1,4-cyclohexane diol would also be suitable as chain extenders in the practice of this invention. These chain extenders may be used alone or in combination.

Useful aromatic amine terminated chain extenders include, for example, 1-methyl-3,5-diethyl-2,6-diaminobenzene and 1-methyl-3,5-diethyl-2,4-diaminobenzene (which materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,5-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

A wide variety of aromatic polyisocyanates may be used. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

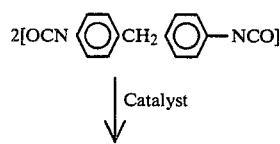

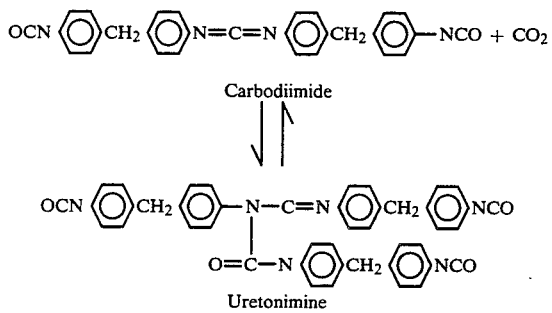

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

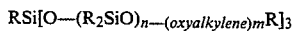

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, are known to those skilled in the art. For example, chopped or milled glass fibers, chopped or milled carbon fibers and/or other mineral fibers are useful.

Post curing of the elastomer may be desirable. Post curing will improve some properties such as heat sag. Employment of post curing depends on the desired properties of the end product.

The examples which follow exemplify the improvement obtained by the process of this invention. However, these examples are not intended to limit the scope of the invention.

Each of the example RIM formulations which follow were processed on an Accuratio VR-100 high pressure impingement mixing RIM machine. The impingement mixing pressures were about 2,000 psi and the material was injected into a steel flat plaque mold after mixing. The mold is milled to produce plaques which are 18"×18"×⅛". The mold temperature is typically 150°–160° F.

| GLOSSARY | |
|---|---|
| JEFFAMINE ® T-5000 | A 5000 molecular weight polyoxypropylenetriamine. A product of Texaco Chemical Co., Bellaire, TX. |
| ISONATE ® 143L | A liquid MDI product. A product of The Upjohn Co. |
| THANOL ® SF-5505 | A 5500 molecular weight polyoxyalkylene triol with a high percentage of terminal hydroxyl groups derived from ethylene oxide. |
| PLURONIC ® F-98 | A surfactant sold by BASF Wyandotte. |
| Z-6040 | An epoxy silane coupling agent. A product of Dow-Corning. |

EXAMPLE 1

This example describes the synthesis of the modified polyamine used in the following examples. JEFFAMINE T-5000 polyamine (70.0 lb) was charged to a clean 10-gallon kettle. The reaction was purged with nitrogen and isatoic anhydride (6.28 lb) was added. The reaction was heated to 40° C. for one hour and then heated to 50° C. for another hour. The temperature of the kettle was again raised and held for one hour at 90° C. The brown liquid product (74.6 lb) was removed from the reactor at 50° C. Amine analysis for this sample indicated a total amine value of 0.46 meq/g.

EXAMPLE 2

To a 500 ml three necked flask equipped with a source of nitrogen and a mechanical stirrer, ISONATE ® 143LM (86.66 g) was added to the flask. The modified JEFFAMINE ® amine (43.33 g), prepared in the manner described in Example 1, was slowly added to the stirrer solution using a dropping funnel, over a thirty minute period. The reaction was stirred for an additional hour. Inspection of the reaction mixture showed the product to be a liquid with no indications of gel formation. During the course of addition of the modified JEFFAMINE amine, the reaction temperature increased by 2° C. The product was a brown liquid.

EXAMPLE 3

Example 2 was repeated in the same manner with the same results.

EXAMPLE 4

ISONATE 143L (10.0 lbs) was added to a clean 5-gallon can which had a stream of nitrogen blowing into the can. A mechanical stirrer, a drill with a metal stirrer connected to it, was used to mix the reaction mixture together. A modified JEFFAMINE amine (5.3 lbs), prepared in the manner described in Example 1, was slowly poured into the stirrer solution over a twenty minute period. No strings or gels were seen upon examination of the brown liquid product.

EXAMPLE 5

Example 5 is similar to Example 4 except the ISONATE 143L (26.18 lb) and the product made by the procedure in Example 1 (12.2 lb) were added to a 5-gallon can and was rolled on a can roller for three hours. The brown liquid product did not have any indication of gel formation after storage in a 100° F. oven for one month. Analysis of this quasi-prepolymer had an isocyanate value of 4.21 meq/g.

EXAMPLE 6

The following formulation was processed in a RIM machine (Accuratio VR-100) to prepare a reaction injection molded elastomer. This example is used as a comparison to Example 7.

| B-Component | |
| --- | --- |
| JEFFAMINE ® T-5000, pbw | 62.33 |
| Diethyltoluenediamine, pbw | 27.5 |
| A-Component | |
| Upjohn Code 205 Isocyanate, pbw (2 ISONATE 143L/1 THANOL ® SF-5505) | 81.59 |

EXAMPLE 7

The following formulation was processed in a RIM machine (Accuratio VR-100). This example is used to show the improvement that the quasi-prepolymer has on the elastomer. In this example, the quasi-prepolymer is made from ISONATE 143L and a modified polyamine. Example 10 describes the synthesis of this quasi-prepolymer.

| B-Component | |
| --- | --- |
| JEFFAMINE ® T-5000, pbw | 62.33 |
| Diethyltoluenediamine, pbw | 27.5 |
| A-Component | |
| ISONATE 143L, pbw | 55.5 |
| Modified polyamine, pbw | 27.6 |

EXAMPLE 8

The following formulation was processed in a RIM machine (Accuratio VR-100). This example is used as a comparison to Example b 9.

| B-Component | |
| --- | --- |
| JEFFAMINE ® T-5000, pbw | 62.33 |
| Diethyltoluenediamine, pbw | 53.0 |
| PLURONIC ® F-98, pbw | 1.0 |
| Z-6040, pbw | 1.5 |
| Oleic acid, pbw | 0.75 |
| Zinc stearate, pbw | 3.0 |
| 1/64" flake glass, wt. % | 20.0 |
| A-Component | |
| Upjohn Code 205 Isocyante, pbw (2 ISONATE 143L/1 THANOL ® SF-5505) | 150.24 |

EXAMPLE 9

The following formulation was processed in a RIM machine (Accuratio VR-100). This example uses the modified polyamine which is used to make the quasi-prepolymer. The synthesis of the quasi-prepolymer is described in Example 10.

| B-Component | |
| --- | --- |
| JEFFAMINE T-5000, pbw | 62.33 |
| Diethyltoluenediamine, pbw | 53.0 |
| PLURONIC F-98, pbw | 1.0 |
| Z-6040, pbw | 1.5 |
| Oleic acid, pbw | 0.75 |
| Zinc stearate, pbw | 3.0 |
| 1/64" flake glass, wt. % | 20.0 |

| A-Component | |
| --- | --- |
| ISONATE 143L, pbw | 99.8 |
| Modified polyamine, pbw | 52.9 |

EXAMPLE 10

The quasi-prepolymers used in Examples 6-9 were made by mixing ISONATE 143L with a modified polyamine in a five-gallon can and rolling on a drum roller for several hours. The quasi-prepolymer was then set aside for several days prior to use. The modified polyamine was made by reacting JEFFAMINE T-5000 (1 mole) with isatoic anhydride (3 moles) by the general method described in Example 1. The following table lists the properties of the elastomers prepared in Examples 6-9.

| | 6 | 7 | 8 | 9 |
| --- | --- | --- | --- | --- |
| Tensile, psi | 5030 | 4130 | 4740 | 5380 |
| Elongation, % | 190 | 170 | 18 | 20 |
| Tear, pli | 585 | 550 | | |
| Flex. mod., psi * 1000 | 59 | 65 | 292 | 354 |
| Room temperature | | | | |
| 158° F. | 49 | 49 | 239 | 266 |
| 311° F. | 48 | 40 | 201 | 232 |
| −20° F. | 138 | 137 | 431 | 499 |
| Heat sag, mm | | | | |
| 250° F. | 3.9 | 3.9 | | |
| 311° F. | 9.0 | 13.1 | 2.4 | 2.1 |
| 325° F. | | | 2.8 | 2.4 |
| 400° F. | | | 16.2 | 13.9 |
| Izod impact | 8.8 | 7.5 | 1.3 | 1.0 |

The room temperature flex modulus in Example 7 is improved compared to Example 6. In Example 9, all of the flexural modulus is improved over Example 8. Other properties are also improved over Example 8.

We claim:

1. A quasi-prepolymer prepared from the reaction between aromatic isocyanates and a compound comprising a reaction product of a polyoxyalkylene polyamine selected from the group consisting of triamines wherein the alkylene is ethylene, propylene or butylene, having an average molecular weight of about 400 to 10,000 and diamines of the formula:

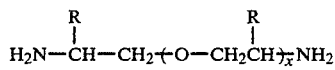

wherein x is an integer of at least about 2.6 to 84 and R is hydrogen, methyl or ethyl, and an isatoic anhydride of the formula:

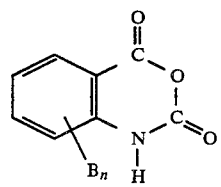

where B is selected from the group consisting of hydrogen, alkyl, nitro, halo, hydroxy, amino and cyano, and n is a number of 1–4.

2. A quasi-prepolymer of claim 1 where R is methyl and the triamine is a polyoxypropylene triamine.

3. A quasi-prepolymer as in claim 1 prepared from the triamine and the isatoic anhydride.

4. A quasi-prepolymer as in claim 1 prepared from the diamine and the isatoic anhydride.

5. A RIM elastomer made using the quasi-prepolymer of claim 1.

6. A RIM elastomer made using the quasi-prepolymer of claim 2.

7. A RIM elastomer made using the quasi-prepolymer of claim 3.

* * * * *